Nov. 20, 1951 W. A. PITTS 2,576,041
ALIGNMENT DEVICE FOR MEASURING WHEELS
Filed July 7, 1948 4 Sheets-Sheet 1

INVENTOR.
WILLIAM A PITTS
BY
ATTORNEY.

Nov. 20, 1951   W. A. PITTS   2,576,041
ALIGNMENT DEVICE FOR MEASURING WHEELS
Filed July 7, 1948   4 Sheets-Sheet 2

INVENTOR.
WILLIAM A. PITTS
BY
ATTORNEY.

Nov. 20, 1951  W. A. PITTS  2,576,041
ALIGNMENT DEVICE FOR MEASURING WHEELS
Filed July 7, 1948  4 Sheets-Sheet 3

*INVENTOR.*
WILLIAM A. PITTS
BY

ATTORNEY.

Nov. 20, 1951 W. A. PITTS 2,576,041
ALIGNMENT DEVICE FOR MEASURING WHEELS
Filed July 7, 1948 4 Sheets-Sheet 4
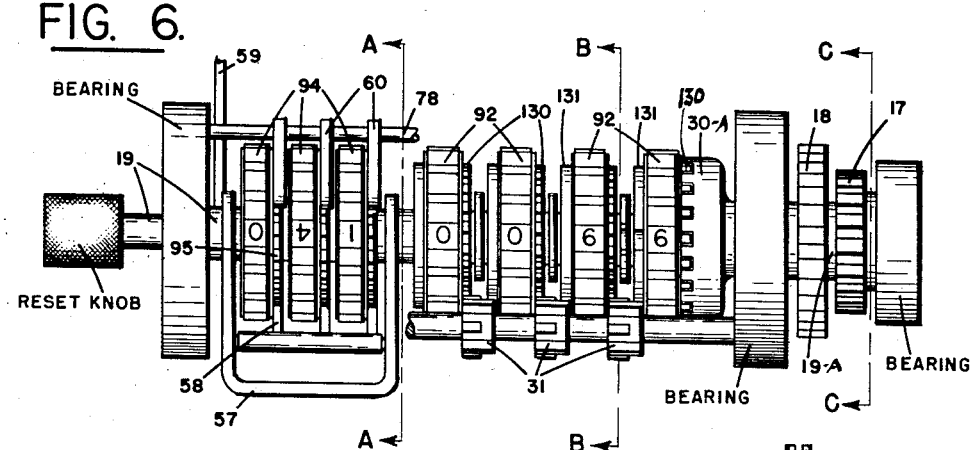
FIG. 6.
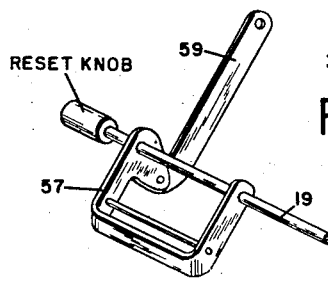
FIG. 6A.
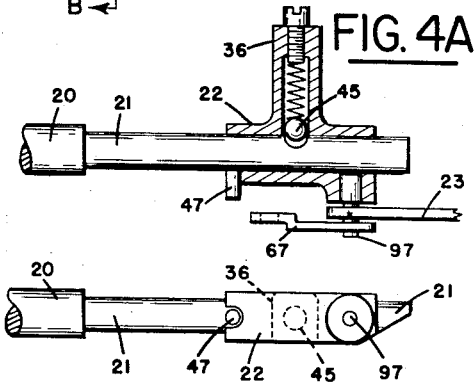
FIG. 4A.
FIG. 4B.
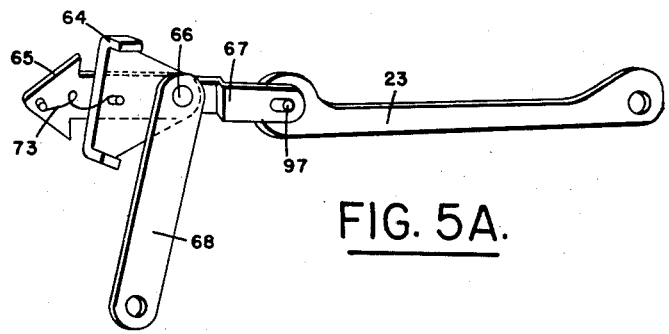
FIG. 6B.
FIG. 5A.
INVENTOR.
WILLIAM A. PITTS
BY
ATTORNEY.

Patented Nov. 20, 1951

2,576,041

UNITED STATES PATENT OFFICE 2,576,041

ALIGNMENT DEVICE FOR MEASURING WHEELS

William A. Pitts, Houston, Tex., assignor, by mesne assignments, to Standard Oil Development Company, Elizabeth, N. J., a corporation of Delaware Application July 7, 1948, Serial No. 37,422

3 Claims. (Cl. 101—99)

The present invention is directed to an improved device for the alignment of measuring wheels and is especially adapted for use in conjunction with high speed printing counters.

Automatic indicating wheels are in common use in various types of measuring and calculating equipment. Such wheels often carry numbered type faces on their surfaces and are used for printing the indicated numbers on paper tape or other surfaces, usually by bringing a platen carrying the paper into contact with the type faces. With devices provided for uniform, stepwise movement of the counting wheels, the proper alignment of the type faces for printing is usually not difficult as such wheels are normally connected through gear or other stepwise mechanism adapted to move the wheels only in units representing the distance between type faces. Also, wheels of this type normally move at a relatively slow speed and "click" or ratchet type engagement is permissible for further alignment and is often used. However, in devices in which one or more of the counting wheels are rotated at extremely high velocities of the order of 4,000 to 8,000 or more revolutions per minute, and in which free running wheels are desirable due to gearing with a continuously moving element, such as a measuring tape, the use of clicks or ratchets is not satisfactory. They exert too strong a braking force on the rotating wheel which is greatly magnified through the usual reduction ratio gear train; also, they rapidly become worn and disintegrate due to the excessive punishment resulting from such high speed operation.

It is an object of the present invention to provide an alignment device suited for use with such continuous (as distinguished from stepwise) operation of counting or measuring wheels, including those normally used at high speeds.

A further object of this invention is to provide such alignment devices which are normally not in contact with the rotating parts and hence exert no braking action thereon and which are brought into contact with the rotating parts for purposes of alignment only at the end of the computing or measuring cycle when the wheels are relatively stationary.

It is a further object to provide automatic means for accomplishing this alignment in the manner indicated above.

A still further object of this invention is to provide automatic safety means for holding the numbering wheels in position against slippage as the alignment is being executed and throughout the following printing operation.

Other and further objects will be apparent from the following description of this invention in connection with the drawings which illustrates a suitable embodiment thereof for use with a tape measuring and printing device described in an application entitled, "Printing Tape" filed by Martin E. True on April 9, 1948, bearing the Serial Number 19,954.

Referring to the drawings,

Fig. 1 is a front elevation in partial section of one embodiment of the device;

Fig. 1-A is a plan view of the perforated steel tape;

Figure 5:
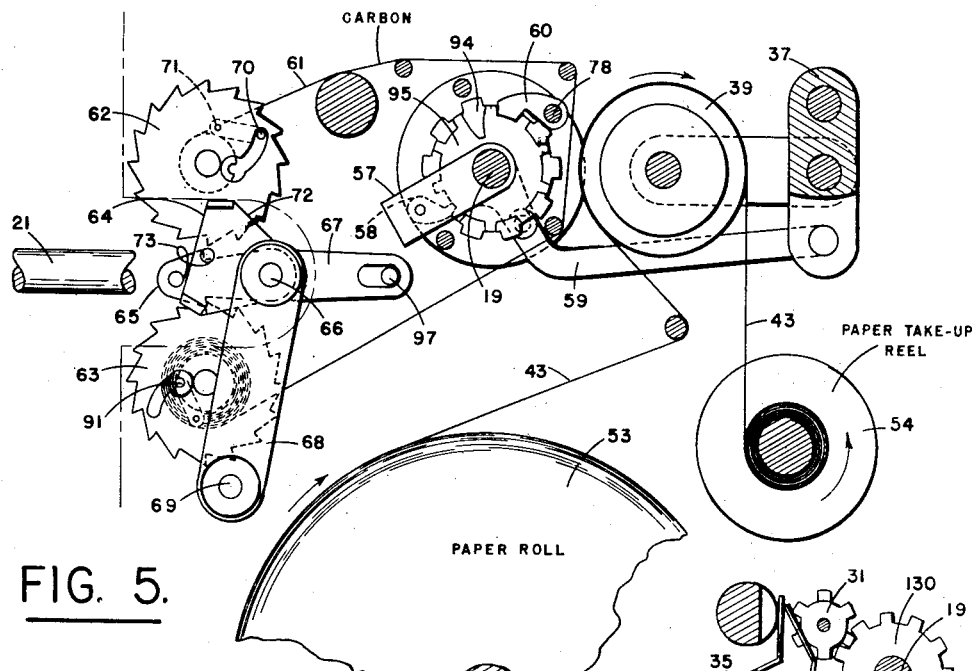
Figure 3A:
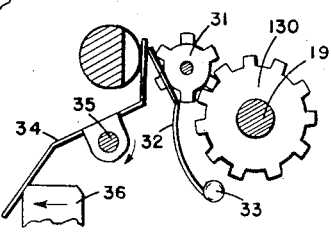
Fig. 3 is a partial sectional view of a portion of the printing mechanism.
Figure 3:
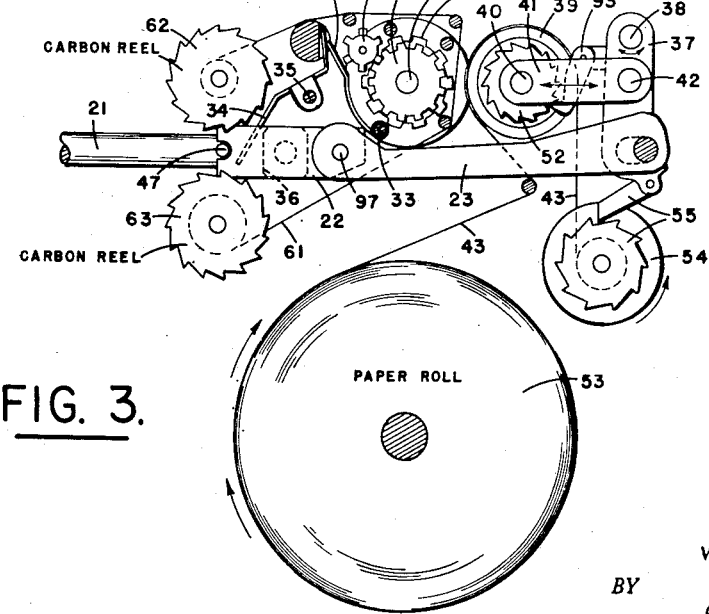

Fig. 3-A is an enlarged view of the alignment device for the printing wheels of the counter;

Figs. 4-A and 4-B are detailed plan and elevation views of the trigger escape joint mechanism;

Fig. 5 is a section view of the metering device illustrating the counter wheel advancing mechanism and the inked ribbon supply. The counter wheel portion of this figure is a sectional view A—A of Fig. 6;

Fig. 5-A is a detail feature of the ribbon reversing toggle of Fig. 5;

Fig. 6 is a plan view of the measuring and counting units.

Fig. 6-A is a perspective view of a gear element of Fig. 6, and Fig. 6-B is a perspective view of the linkage for operating the counting unit.

Figure 2:
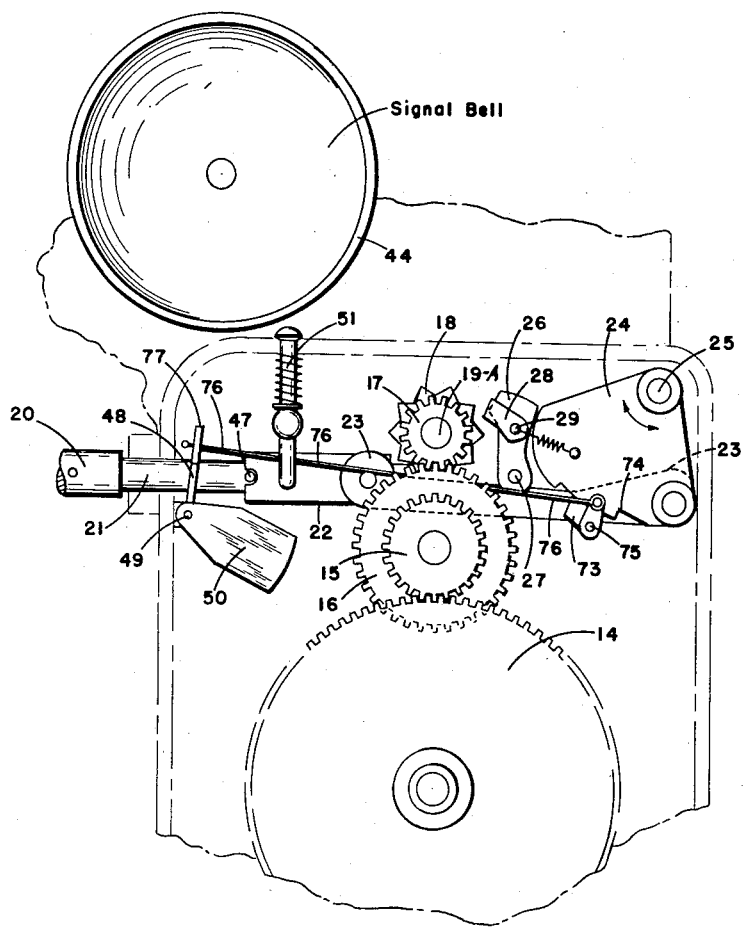
Fig. 2 is an interior section of the metering device illustrating the measuring tape gear train, the locking and expansible linkages connecting with the trigger mechanism, and the alignment device for the printing wheel of the length measuring unit.

Sections A—A, B—B, and C—C of Fig. 6 are illustrated respectively in Figs. 5, 3 and 2.

Similar numbers represent similar parts throughout the several figures of the drawings.

Figure 1:
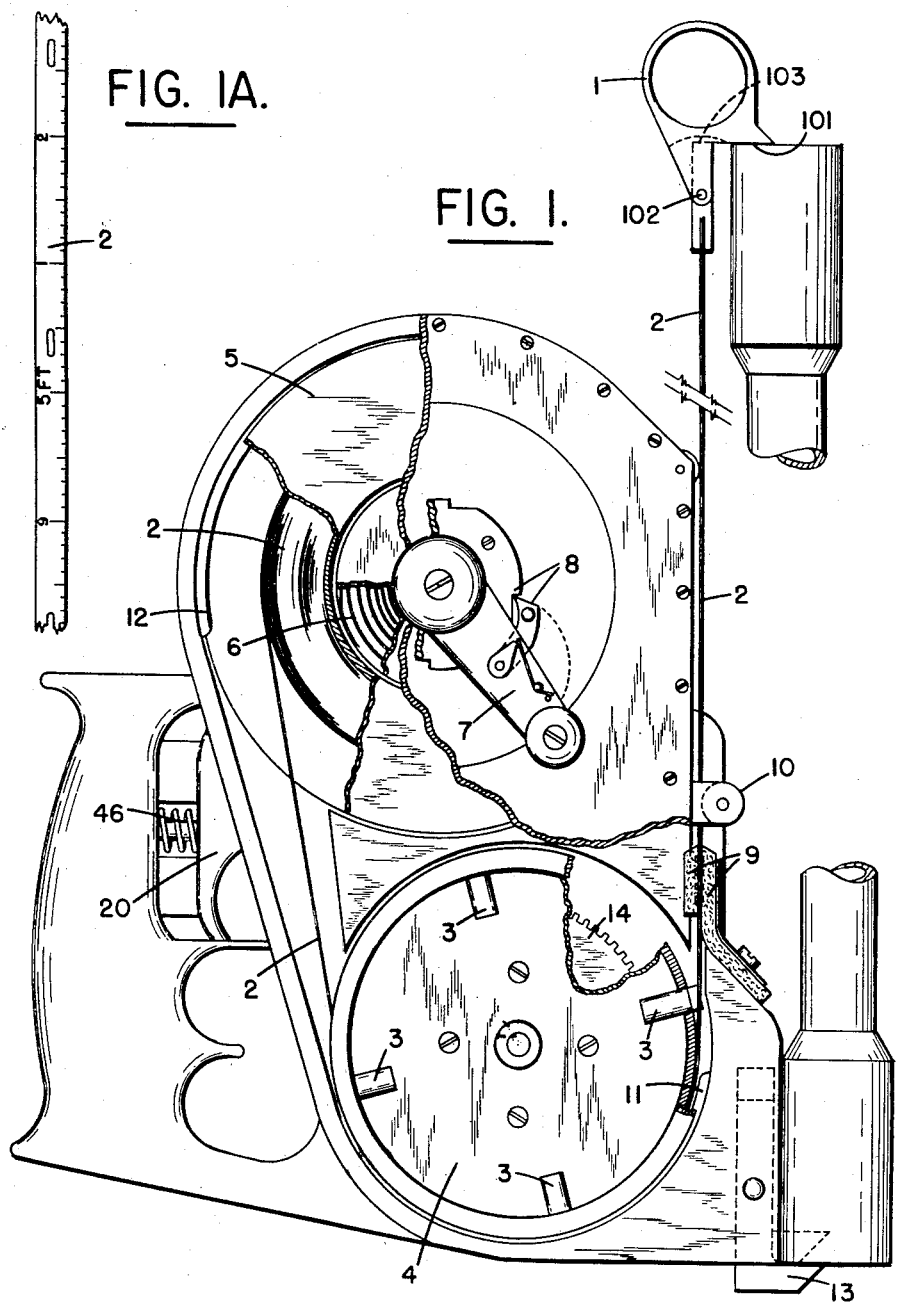

Referring now to the drawing in detail, the steel measuring tape 2, Fig. 1, is the conventional type except with perforations along its center to engage the metering wheel sprocket teeth 3. The tape is pulled out the desired length by the ring 1, turning the metering wheel 4 as it unwinds from the tape reel 5. The hub in the tape reel houses a flat-wound spring 6. The tape reel is driven by the crank 7 through this flat-wound spring. The crank can be locked into any one of the several positions, as shown, by means of the ratchet and dog 8. When so locked and the tape is pulled out farther, a torque is built up in the flat-wound spring, thus putting a tension on the reeled-off measuring tape. This permits taking succesive measurements which are within the travel allowed by the flat-wound spring without further adjustment of the crank. The dog can be disengaged for free unwinding of the measuring tape by toggling the dog to its other position near the crank handle.

Wipers 9 wipe off the tape and seal the opening as the tape is wound into the case. Guide roller 10 assures proper tape approach to the wipers and metering wheel.

Rail 11 on the housing insures proper meshing of the tape with the metering wheel sprocket teeth, and a similar rail 12 for the tape reel keeps the tape within its flanges.

Reference shoulder 13 has a plunger action and slides within the protruding part of the housing to its two positions, one shown in solid lines and the other in dotted lines. In either case, the measurement is taken from the same reference line, which is the bottom edge of the housing, thus permitting measurements to be taken either from a flat surface or a shoulder. A set screw is preferably provided for locking the reference shoulder in either position. The ring end 1 of the tape is provided with a shoulder 101 for taking measurements from shoulders such as a pipe end or the ring may be turned on pivots 102 to permit measurement against a flat surface by tape end 103.

Metering pulley 4 is keyed to the same shaft as gear 14, Fig. 2, which in turn drives gears 15, 16 and 17 making up a gear train with the proper ratio to drive the shaft 19-A on which is keyed the star wheel 18 and the driving crown gear 30-A which drives the first measuring wheel 92, Fig. 6.

When the tape has been pulled out to the distance to be measured, the star wheel 18 and measuring wheel 92 stop rotating. At this point in taking the measurement, the trigger 20 (Fig. 1) is pulled. One pull of the trigger and its return by spring 46 complete all subsequent operations for taking any one measurement and putting the instrument in readiness for the next measurement.

Referring to Fig. 2, the pull exerted on the trigger is transmitted through pull rod 21, the escapement joint 22 (shown in detail in Fig. 4), platen pull link 23 to bell crank 24. Cam action of the bell crank rotating about shaft 25, which is mounted in the housing, pushes indexing pawl 26 into engagement with star wheel 18. Each of the teeth of this star wheel, when engaged by the indexing pawl rotating on shaft 27 (also mounted in the housing), positions one of the ten numerals engraved on the first measuring wheel 92 into alignment for printing. The outline of the tooth on the indexing pawl 26 is the same as between teeth on the star wheel. When the indexing pawl tooth is made to fully mesh with the star wheel by the cam on bell crank 24 then the first counter wheel is properly aligned. Should there be a slight misalignment between a star wheel tooth and the indexing pawl tooth the force applied by the cam of the bell crank assures full mesh by forcing the star wheel forward or back the necessary slight amount. The function of safety lug 28 is to prevent a "dead center" contact should the star wheel come to rest midway between two printing positions in such a manner that the tooth point of the indexing pawl would contact the tooth point of the star wheel and prevent meshing. The outline of the face of the tooth on the safety lug 28 is the same as for the tooth on the indexing pawl proper, and when fully meshed with star wheel, will coincide with it. The safety lug is free to move on its pin 29 which is set in the pawl 26. As the indexing pawl 26 advances to engage star wheel 18 the point of the safety lug tooth 28 leads the point of the indexing pawl tooth 26 and follows a slightly different path about pin 27. Therefore, if the point of the indexing pawl tooth is about to contact a star wheel tooth point, the safety lug tooth will miss the "dead center" by a small amount and by leading the indexing pawl tooth will rotate the star wheel just enough to prevent interference and allow proper meshing, thus assuring alignment of the first measuring wheel for printing.

The measuring counter is a conventional reversible type indicator, adding in one direction and subtracting in the other, with a number of measuring and printing indicator wheels, each driving the next adjacent wheel through a single tooth gear 131, fixed to the measuring wheel, a transfer gear 31 and a gear 130 which rotates the adjacent driven wheel a fraction of the revolution of the driving wheel. In the device illustrated the measuring wheels are designed for the decimal system to indicate feet in hundredths, tenths, units and tens on four wheels. Additional wheels can, of course, be added if a smaller fraction or a longer tape is desired. As indicated above and in Fig. 6, the first measuring wheel 92 is driven from the shaft 19-A through crown gear 30-A keyed to the shaft, the measuring wheels 92 being rotatably mounted on a shaft 19. As this first measuring wheel is brought into alignment by the star wheel 18 of the succeeding measuring wheels are brought into partial alignment at the same time. However, due to the slack between the gears 130, 31 and 131 for each pair of measuring wheels their alignment is not sufficiently close for printing. To obtain proper alignment, an aligning rake 32, is provided and is pivoted on the pin 33, as shown in Fig. 3. The rake has one tine for each transfer gear in the measuring counter, only one of each being shown in Fig. 3. The transfer gears 31 have a portion cut out of alternate teeth as shown in Fig. 6-A. The flat tine is brought into contact with two alternate teeth of the transfer gear 31 and as force is applied, it will rotate the transfer gear 31 and the attached driven gear 130 to a predetermined position which in turn rotates its associated measuring wheel to alignment, as shown in Fig. 3-A. This arrangement will take care of considerable misalignment of the measuring wheels and therefore allow the progressive alignment of all wheels. The aligning force on the rake 32 is supplied through rocker 34, pivoted on pin 35, by the shoulder at 36 on escapement joint 22 as it moves with the trigger pull, rotating the tail of rocker 34 about pivot 35. The play between shoulder at 36 and the tail piece of rocker 34 prevents the rake from engaging the transfer gears before the counter has stopped rotating and is locked by the star wheel 18 and pawl 26.

The printing mechanism will now be described, with reference to Figs. 3 and 5. As the trigger 20 is pulled farther back, rocker arm 37 rotates about shaft 38 (mounted in the housing) and moves platen 39 to contact opposed printing faces of the measuring wheels 92. Platen shaft 40 is moved in straight guide slots (not shown) in the frame by two links 41 on each end which are pinned to rocker arm 37 at 42. As further pressure is applied on the trigger, the required pressure to print is applied on the paper tape 43 which rolls over rubber platen 39. Escapement joint 22 releases after the required pressure is applied and at this moment the bell 44 rings signaling that the reading has been printed.

Just as the platen is about to contact the printing wheels, the various ratchets engage their respective ratchet wheels on the numbering counter (yet to be described), the platen roller and inked ribbon spool. Should the trigger pressure be released slightly and any recession permitted in the mechanism, the numbering counter and platen roller are advanced, either partially or completely, without first having printed. In either case it would ruin the continuity in the measurements being taken. A safety measure is taken to prevent this. As bell crank 24, Fig. 2 is advanced to this critical point by the pull of the trigger, safety pawl 73, pivoted at 75 in the housing, drops into ratchet tooth 74 on bell crank 24. This prevents any recession in its forward travel. Safety pawl 73 remains engaged until the forward printing stroke is completed as signified by the ring of the bell. Arm 77, rigidly connected through pivoted shaft 49 to bell hammer 50, strikes safety pawl pull link 76 and disengages the safety pawl as the hammer advances to sound the bell. The operation of shaft 49 is described as follows.

Fig. 4 shows a section taken through the escapement joint 22. The pull exerted on trigger pull rod 21 is transmitted through the steel ball 45, which is spring loaded into the groove in rod 21, to the joint body 22 and link 23 on the back to the rocker arm 37 (of Fig. 3). When more than the "required" pull is exerted, ball 45 is forced from the groove against the spring pressure and pull rod 21 is released to slide in joint body 22. The joint will remain in the elongated condition until spring 46 (Fig. 1) returns trigger and other mechanism to the end of the return stroke, where the ball drops back into the groove in pull rod 21. The steel ball releases the pull rod 21 instantly and the rod travels the remainder of its movement rapidly. Referring again to Fig. 2, the pin 47 in pull rod 21, thus sharply strikes arm 48 rigidly mounted on shaft 49, thereby swinging hammer head 50 which strikes plunger rod 51 which in turn strikes and sounds bell 44.

Platen 39, Fig. 3, is rotated one spacing on the return stroke by the pawl 93 and ratchet 52 advancing the tape from paper roll 53 to receiving spool 54. Shaft 40 extends through the case and is also fitted with a knob for manually advancing the tape. On each forward stroke of the trigger the ratchet and pawl 55 wind up the printed tape on receiving spool 54 through a drag clutch between the ratchet wheel and spool, thus keeping all slack out of printed tape. The clutch also permits reversing rotation of the receiving spool 54 to unwind printed tape from it without first disengaging pawl 55. Instead of feeding the paper tape on the spool 54 it may be passed out of the instrument and cut or torn off as desired. Also, the printed tape stored on spool 54 during a series of measurements may be unwound, torn off and preserved as a printed record of the measurements taken.

A numbering counter of a customary ratchet, non-reversing type is provided to indicate the number of consecutive operations of the printing mechanism, advancing one unit for each complete cycle of the trigger operation. Any desired number of wheels may be used, the counter illustrated in Figs. 5 and 6 having three counting wheels 94 indicating units, tens and hundreds of operations. The face of each wheel carries type numerals for printing. Attached to each counter wheel is a ratchet 95. These counter wheels are mounted rotatably on the same shaft 19 as the other measuring wheels 92. The advancing arm 57, carrying pawl 58 for each counter wheel ratchet 95, pivots on shaft 19 and is actuated by link 59 from rocker arm 37 as shown in Figs. 4-D and 5. A spring loaded detent or click 60 for each counter wheel ratchet 95 is pivoted on tie pin 78 to engage the ratchet when it is advanced and to hold it in alignment for printing. The counter is advanced one count with each return stroke of the mechanism by engagement of pawl 58 with the teeth of ratchet 95. Shaft 19 is extended through the case with a knurled knob to reset the counter to zero.

An inked ribbon 61 (Figs. 3 and 5), passing between the measuring and counting printing wheels and the rubber platen, carries the ink for printing and is wide enough to supply all wheels 92 and 94. The inked ribbon is fed in front of the printing wheels by the two spools on ratchet wheels 62 and 63, advancing from one to the other and then reversing. The toggle parts 64 and 65 shown in Figs. 5 and 5-A, are both pivoted on pin 66 and energized by expansion spring 73, these reverse the rotation of the spools by causing ratchet 65 to engage first one ratchet wheel and then the other. The reciprocating motion for the ratchet is supplied from the escapement joint 22 through link 67. Link 68 pivoted at 69 carries pin 66 for the toggle thus supporting and approximating straight line motion for it. As ratchet wheel 63 is driven forward by ratchet 65, in the position shown in Fig. 5, the inked ribbon is unwound from the spool on the upper ratchet wheel 62. Pin 70, which runs parallel to the hub of the ribbon spool and is pivoted at 71, is held down on the hub by the ribbon when wound onto the spool as shown for pin 91 in the lower spool 63. This pin projects through slots in the ribbon spool flange and in the ratchet 62. As the last layer of ribbon is unwound from the upper spool 62, pin 70 is released to move outward into the position shown in Fig. 5. Pin 70 then rotates with ratchet wheel 62 until it contacts part 64 of the toggle at point 72, rotating it about pin 66 and thus toggling ratchet 65 to its alternate position to engage ratchet 62 and to reverse the rotation of the spools.

While a specific modification of the present invention has been described above for purposes of illustration, it will be recognized that many variations may be made in the various parts of this device without departing from the spirit of this invention. For example, the inked ribbon mechanism may be entirely omitted if provision such as an ink fountain and roller are provided for inking the printing surfaces. Alternatively a onetime carbon may be rolled with the paper to be printed, the printed record then appearing on the opposite side of the paper. As another alternative, a narrow inked ribbon or a one-time carbon paper ribbon may be passed axially across the face of the characters to be printed. The numbering wheels 94 and their associated parts may be omitted if it is desired to simplify the device merely for indicating and recording distances measured. As a further simplification, the printing mechanism may be entirely dispensed with and the device used merely to indicate the distances measured in a single operation.

Field tests have been conducted with the recording pipe measuring tape described above and illustrated in detail in the drawings. Drill pipe on a rack were measured first with the usual steel tape, preparing a hand-written record following each measurement. The same pipes were then measured with the recording tape instrument. Despite unusual care in making the measurements with the derrick tape, a total of 14 errors was made which had to be corrected by rechecking before the totals shown below were obtained. These errors, which are common ones, were the result of misreading the tape, transposing figures, both in reading and recording, or recording the figures wrong. The measurements made with the recording tape involved no errors and were made very quickly, a time check indicating that the recording tape can be used to measure 100 joints of drill pipe on the rack in twelve minutes. The results of these measurements are given in the following table:

| Number of Pipes | Derrick Tape Measurements | First Recording Tape Measurements | Second Recording Tape Measurements |
|---|---|---|---|
| | Feet | Feet | Feet |
| 104 | 3,168.04 | 3,167.83 | 3,167.95 |
| 122 | 3,771.81 | 3,771.66 | |

It is apparent by comparing the first and second series of recording tape measurements that a very close check was obtained thus indicating the high degree of accuracy provided by this instrument.

It is also contemplated that the locking, alignment and printing devices above may be used separately or together in connection with measuring and/or counting wheels in other types of devices in addition to the tape illustrated, and in which the drive to operate such wheels may be derived from any continuously or intermittently operating device.

I claim:

1. In a registering counter mechanism, including a housing, a shaft in said housing, a series of registering counter elements mounted rotatably on said shaft, each element provided with a uniform number of uniformly spaced circumferential registering indicia, gear means fixedly engaging said shaft and the first counter element in said series of elements, for rotating said shaft and said first element, and manually operated trigger mechanism mounted in said housing having a reciprocal outward and inward operating stroke with reference to said housing, and gear means driven through said first element for serially rotating the remaining counter elements in said series, the improvement which comprises primary means for aligning said counter elements and for fixing the aligned position of the first element in said series including a star wheel fixedly mounted on said shaft and rotatable therewith, said wheel having a plurality of uniformly spaced, substantially triangular, circumferential tooth portions coincident in number and disposition to the number and disposition of the recording indicia on each of said counter elements, an indexing pawl, having an upper end and a lower end, pivotally mounted by said lower end in said housing for limited reciprocal movement arcuately toward and away from said star wheel in substantially the same plane therewith, a tooth portion on the upper end of said pawl extending therefrom toward the star wheel, said portion having substantially the same conformation as the star wheel tooth portion and adapted to mesh therewith, a lug member, having an upper and a lower end, pivotally mounted by said lower end laterally of said pawl and intermediate its ends, a tooth portion on the upper end of said member extending toward the star wheel beyond and arcuately below said pawl tooth portion, said lug tooth portion substantially conforming to the size and shape of a star wheel tooth portion and also adapted to mesh therewith, leading said pawl tooth portion into such a relationship, said lug member pivoted on said pawl for arcuate movement in engaging a star wheel tooth portion to bring the lug tooth portion into substantial coincidence with the pawl tooth portion when meshed with said star wheel, cam means pivotally supported in said housing in substantially the same plane with said star wheel and pawl and rearwardly of said pawl, said cam means pivotally engaging said trigger mechanism and arcuately movable thereby during the outward and inward strokes thereof to move and force said pawl and lug member into meshed engagement with said star wheel by rotation of the wheel during the outward stroke of said mechanism, spring retainer means connecting said pawl and cam means holding said pawl in substantially constant rearward contact with said cam, locking means for said cam means engageable therewith during the outward stroke of said trigger mechanism, holding said cam means against reverse movement prior to completion of the said stroke, and secondary means for aligning and fixing the aligned position of said counter elements mounted in said housing engageable with said gear means for serially rotating the remaining counter elements in said series of elements.

2. A mechanism according to claim 1 in which said gear means for serially rotating the remaining counter elements in said series of elements includes a transfer gear for each of said elements, each gear freely mounted for rotation on a common shaft and having lateral cutout portions spacing alternate teeth thereon, said transfer gears engaging related gear elements fixedly related to said remaining counter elements, and in which said secondary means for aligning and fixing the aligned position of said counter elements comprises a rake member having a plurality of laterally spaced tines, each tine engageable in a cutout portion of a transfer gear with two alternate gear teeth thereof, said rake pivotally mounted in said housing for arcuate movement into engagement with said transfer gears, and a rocker arm pivotally mounted in said housing engageable at one end with said rake and at the other end by said trigger mechanism during a portion of the outward stroke thereof to force said tines into the cutout portions of said transfer gears and into engagement with said two alternate transfer gear teeth whereby said transfer gears and thereby said elements are forced into predetermined alignment and fixed in an aligned position during engagement of said rocker arm by said trigger mechanism.

3. A mechanism according to claim 1 in which said locking means comprises a plurality of ratchet teeth disposed in a peripheral portion of said cam, and a ratchet pawl pivotally mounted in said housing to engage said teeth during the outward stroke of said trigger mechanism, and means for disengaging said pawl at the end of said stroke.

WILLIAM A. PITTS

REFERENCES CITED

The following references are of record in the file of this patent:

UNITED STATES PATENTS

| Number | Name | Date |
|---|---|---|
| 907,577 | Diehl | Dec. 22, 1908 |
| 976,295 | Reinhardt | Nov. 22, 1910 |
| 1,237,808 | Ottinger | Aug. 21, 1917 |
| 1,389,215 | Payne | Aug. 30, 1921 |
| 1,560,392 | Mager | Nov. 3, 1925 |
| 1,746,516 | Boyer | Feb. 11, 1930 |
| 2,136,461 | Petty | Nov. 15, 1938 |
| 2,435,434 | Kosmer | Feb. 3, 1948 |